US012803474B2

(12) United States Patent
Takeda et al.

(10) Patent No.: US 12,803,474 B2
(45) Date of Patent: Nov. 17, 2026

(54) CONTROLLER AND PROCESSING DEVICE

(71) Applicant: Hitachi Industrial Equipment Systems Co., Ltd., Tokyo (JP)

(72) Inventors: Kenji Takeda, Tokyo (JP); Tomoyuki Aoyama, Tokyo (JP); Junnosuke Imura, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 246 days.

(21) Appl. No.: 18/727,368

(22) PCT Filed: Jan. 26, 2022

(86) PCT No.: PCT/JP2022/002877
§ 371 (c)(1),
(2) Date: Jul. 9, 2024

(87) PCT Pub. No.: WO2023/144923
PCT Pub. Date: Aug. 3, 2023

(65) Prior Publication Data

US 2025/0080015 A1 Mar. 6, 2025

(51) Int. Cl.
*H02P 29/024* (2016.01)
*H02P 3/18* (2006.01)
(Continued)

(52) U.S. Cl.
CPC ............ *H02P 3/18* (2013.01); *H02P 23/0077* (2013.01); *H02P 23/14* (2013.01); *H02P 23/20* (2016.02); *H02P 27/08* (2013.01)

(58) Field of Classification Search
CPC ........ H02P 3/18; H02P 23/0077; H02P 23/14; H02P 23/20; H02P 27/08; H02P 29/024; G05B 9/02
See application file for complete search history.

(56) References Cited

U.S. PATENT DOCUMENTS 4,855,653 A 8/1989 Lemirande
2006/0275970 A1* 12/2006 Nadd .................. H02H 7/0838 257/288
(Continued)

FOREIGN PATENT DOCUMENTS

EP 3 355 462 A1 8/2018
JP 2011-8642 A 1/2011
(Continued)

OTHER PUBLICATIONS

A. R. Chandran, M. D. Hennen, A. Arkkio and A. Belahcen, "Safe Turn-Off Strategy for Electric Drives in Automotive Applications," in IEEE Transactions on Transportation Electrification, vol. 8, No. 1, pp. 9-22, Mar. 2022, doi: 10.1109/TTE.2021.3104461.*
(Continued)

*Primary Examiner* — Muhammad S Islam
(74) *Attorney, Agent, or Firm* — Crowell & Moring LLP

(57) ABSTRACT

A controller 1 is provided with: a motor controller (10, 11, etc.) that supplies a drive current to a motor 3, which is a power source of a processing device so as to place the motor 3 in a normal operating state, and, in response to multiplexed commands (S1, S2) that are sent from outside and relate to a safety function operation of the processing device, controls the drive current so as to place the motor 3 and the processing device in a safety stop state; and a command monitoring unit 16 that monitors whether or not the commands (High/Low of S1, S2) match each other. If a period during which the commands do not match exceeds an allowable value, the command monitoring unit 16 generates a safety stop signal Sd (High) for safely stopping the motor 3, and continuously sends the safety stop signal Sd (High) to the motor controller. This configuration makes it possible to facilitate construction of a safety system that uses the controller.

14 Claims, 7 Drawing Sheets

(51) Int. Cl.

| | |
|---|---|
| ***H02P 23/00*** | (2016.01) |
| ***H02P 23/14*** | (2006.01) |
| ***H02P 23/20*** | (2016.01) |
| ***H02P 27/08*** | (2006.01) |

(56) References Cited

U.S. PATENT DOCUMENTS

| | | | |
|---|---|---|---|
| 2010/0327667 | A1 | 12/2010 | Fujita et al. |
| 2011/0221377 | A1 | 9/2011 | Ueno |
| 2011/0241447 | A1 | 10/2011 | Ando et al. |
| 2017/0272025 | A1 | 9/2017 | Jimbo et al. |
| 2019/0363650 | A1* | 11/2019 | Hashimoto ............... H02P 3/18 |
| 2020/0073359 | A1 | 3/2020 | Yoshigi |
| 2020/0370644 | A1 | 11/2020 | Sakaguchi |
| 2021/0091705 | A1* | 3/2021 | Bhat .................... H02H 7/0838 |
| 2022/0185623 | A1* | 6/2022 | Schaller .................... B66B 1/30 |

FOREIGN PATENT DOCUMENTS

| | | |
|---|---|---|
| JP | 2015-14862 A | 1/2015 |
| JP | 2020-35129 A | 3/2020 |

OTHER PUBLICATIONS

International Search Report (PCT/ISA/210) issued in PCT Application No. PCT/JP2022/002877 dated Apr. 26, 2022 with English translation (5 pages).
Japanese-language Written Opinion (PCT/ISA/237) issued in PCT Application No. PCT/JP2022/002877 dated Apr. 26, 2022 with English translation (6 pages).
Extended European Search Report issued in European Application No. 22923791.2 dated Nov. 17, 2025 (10 pages).
Japanese-language Office Action issued in Japanese Application No. 2023-576451 dated Nov. 5, 2024 with English translation (6 pages).

* cited by examiner

CONTROLLER AND PROCESSING DEVICE

TECHNICAL FIELD

The present invention relates to a controller and a processing device and, in one non-limiting example, to a controller for controlling an operation of a motor in various types of processing devices or machine drive systems that include motors.

BACKGROUND ART

In a field of various processing devices equipped with motors (e.g., injection molding machines, press machines), in order to ensure safety of the processing device and a surrounding environment, etc., a safe stop function that performs control safely stopping the motor of the device (hereinafter for sometimes abbreviated as "safety function") must be provided. Specifically, the control for safely stopping the motor includes various types of control such as torque-off stop and deceleration stop. This control is executed based on a signal (sometimes called a safety signal or the like) from an external device provided outside the device.

As a conventional example of performing torque-off control of a motor, for example, there is a technique described in Patent Document 1 below. Patent Document 1 discloses a power converter with an STO (safe torque off) function. In addition, the safety functions of mechanical drive systems using motors are internationally standardized, and the above STO is one of the internationally standardized (defined) safety functions. The STO function can be said to be a function for forcibly interrupting the torque of the motor.

On the other hand, a specific configuration of each block such as input, output, and monitoring in the safety function is not standardized and is left to individual product design.

RELATED ART DOCUMENTS

Patent Documents

Patent Document 1: Japanese Patent Application Laid-open No. 2011-8642

SUMMARY OF THE INVENTION

Problems to be Solved by the Invention

By the way, in order to strengthen the safety function, in the individual product design, it is conceivable to have such a configuration that a safety signal from the external device and therefore a path (safety route) of the signal are duplicated and the same safety signal is outputted from the external device at the same time and in parallel. Even if a failure occurs in one of the safety paths by adopting such a configuration, the control for safely stopping the motor can be executed.

Double safety path monitoring can be realized, for example, by externally monitoring an operating state of an output block that outputs a control signal to a motor drive circuit. On the other hand, when this is applied to industrial machine systems that use multiple-axis motors and their controller, such as servo press machines and plastic processing machines, there are problems in that burden of monitoring increases in a host system and a failure rate due to wiring etc. increases.

An object of the present invention is to facilitate construction of a safety system in an industrial machine in which the motor is used by incorporating a monitoring function for a multiple system safety system and a protection function according to a monitoring result into a control system that drives and controls the motor.

Means for Solving the Problems

In order to achieve the above objects, the present invention employs a configuration and a method described in a scope of patent claims. As an example, a controller of the present invention:

Includes: a motor driver sending a drive current to a motor to put the motor into a normal operation state and controls the motor so that the normal operation state goes into a safe stop state according to a multiple command related to a safety function operation sent from outside; and a command monitoring unit monitoring whether each of the commands match each other, when a period in which the commands do not match each other exceeds an allowable value, the command monitoring unit generates a safe stop command to cause the motor to stop and continuously sends the generated safe stop command to the motor controller.

Effects of the Invention

According to the present invention, it is possible to easily construct a safety system in an industrial machine system using a motor.

DETAILED DESCRIPTION OF PREFERRED EMBODIMENTS

Schematic Configuration

Figure 1:
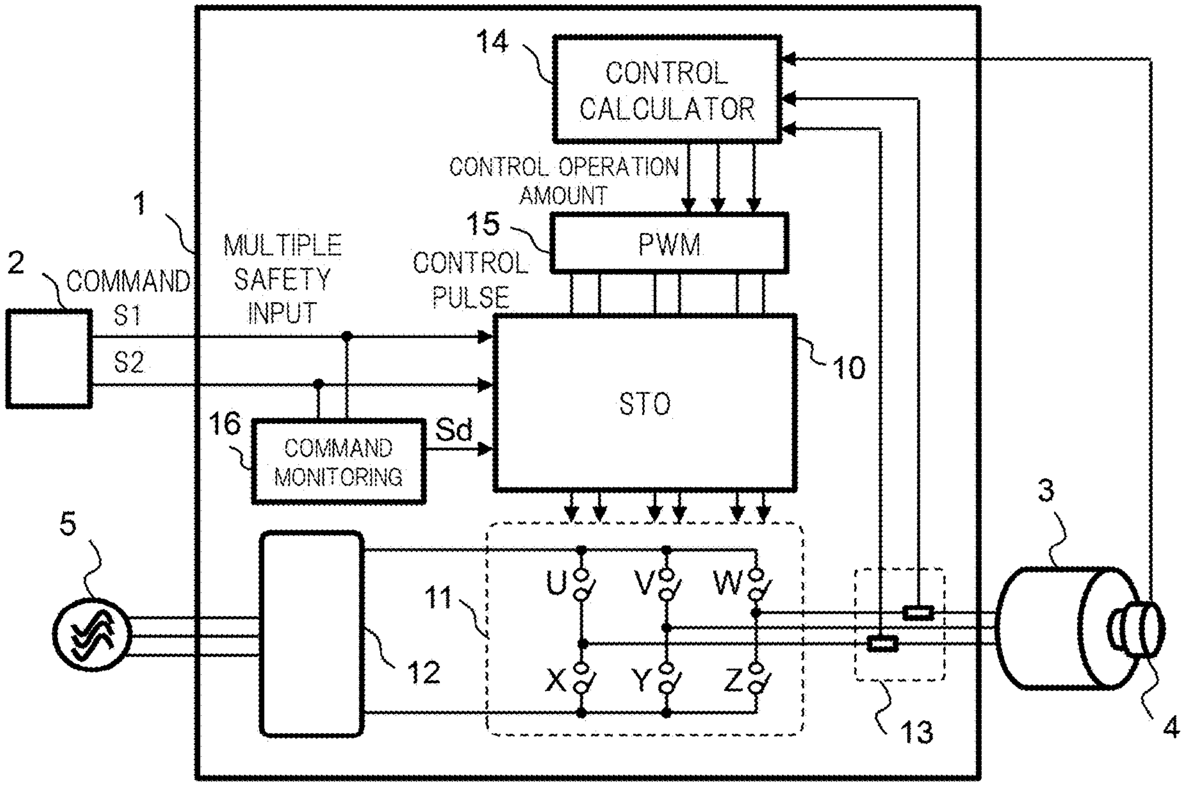
FIG. 1 is a circuit diagram showing a configuration of a motor controller according to a first embodiment of the present disclosure.

Hereinafter, before describing each embodiment of the present disclosure, schematic contents common to each embodiment will be described with reference to the drawings as appropriate. A processing device system described below is mainly composed of a combination of the following devices (1) to (3).

(1) Motor Controller (Indicated by Reference Numerals 1, 1A, and 1B in FIGS. 1, 5, and 7, and Reference Numeral 1 is Used Representatively Below)

A motor controller 1 is a device for controlling three operations (rotation start/stop, rotation direction, rotation speed, etc.) of an electric motor (hereinafter simply referred to as a motor) 3 used as a power source for a processing device, and is a main device (controller) in the disclosed processing device system. The motor controller 1 comprises various functional block units as shown in FIGS. 1, 5 and 7 in order to control the operations of the motor 3 and therefore the processing device in which the motor 3 is used.

Note that the motor 3 and the processing device using the motor controller 1 is not particularly limited, and examples thereof include various industrial devices such as plastic processing machines such as servo press machines and injection molding machines.

(2) External Safety Device (Indicated by Symbols 2 and 2A in FIGS. 1, 5, and 7, and Symbol 2 Will be Used Representatively Below)

The external safety device 2 is a device for: monitors the operation of the motor 3 or the processing device; generating multiple commands (arbitrary number of signals indicating the same content for Lo/High) regarding the safety function operation of the processing device; and transmitting (inputting) the generated multiplex commands to the motor controller 1 through a transmission system.

As shown, the external safety device 2 is an external device separate from the motor controller 1 and, in this example, is connected to the motor controller 1 via multiple (double in each figure) signal lines and a wired interface. Note that the connection between the motor controller 1 and the external safety device 2 may be partially or wholly replaced by communication means (wireless interface). The external safety device 2 can also be called a safety function unit. Further, a transmission system (wired or wireless interface etc.) for multiple commands sent from the external safety device 2 (safety function unit) to the motor controller 1 can be called a safety signal transmission unit.

When these external safety devices 2 detect an abnormality in the operation of the motor 3 or the processing device, a stop command (e.g., a pre-defined signal (e.g., Lo or High signal)) for safety stopping the motor 3 and therefore the processing device is sent (inputted) to the motor controller 1. On the other hand, if the external safety device 2 does not detect any abnormality in the operation of the motor 3 or the processing device, an execution command (e.g., High or Lo signal) for executing the control of the motor 3 by the motor controller 1 as it is is sent (inputted) to the motor controller 1. In each figure and below, the above-described stop command and execution command are collectively referred to as safety input signals S1 and S2.

Note that since the configuration of a safety function unit (external safety device 2) which is an external device, a method of detecting an abnormality, and the like are well known, a detailed description thereof will be omitted as appropriate.

Figure 5:
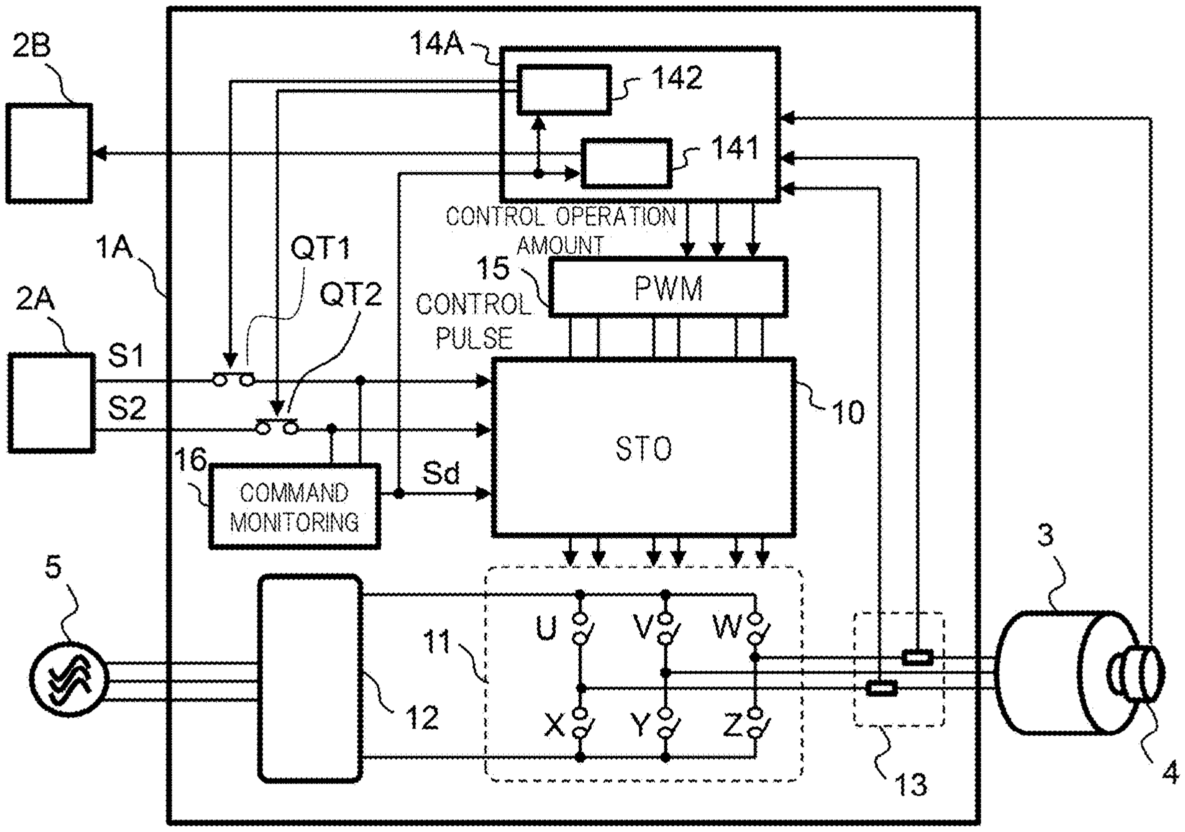
FIG. 5 is a circuit diagram showing a configuration of a motor controller according to a third embodiment of the present disclosure.
Figure 7:
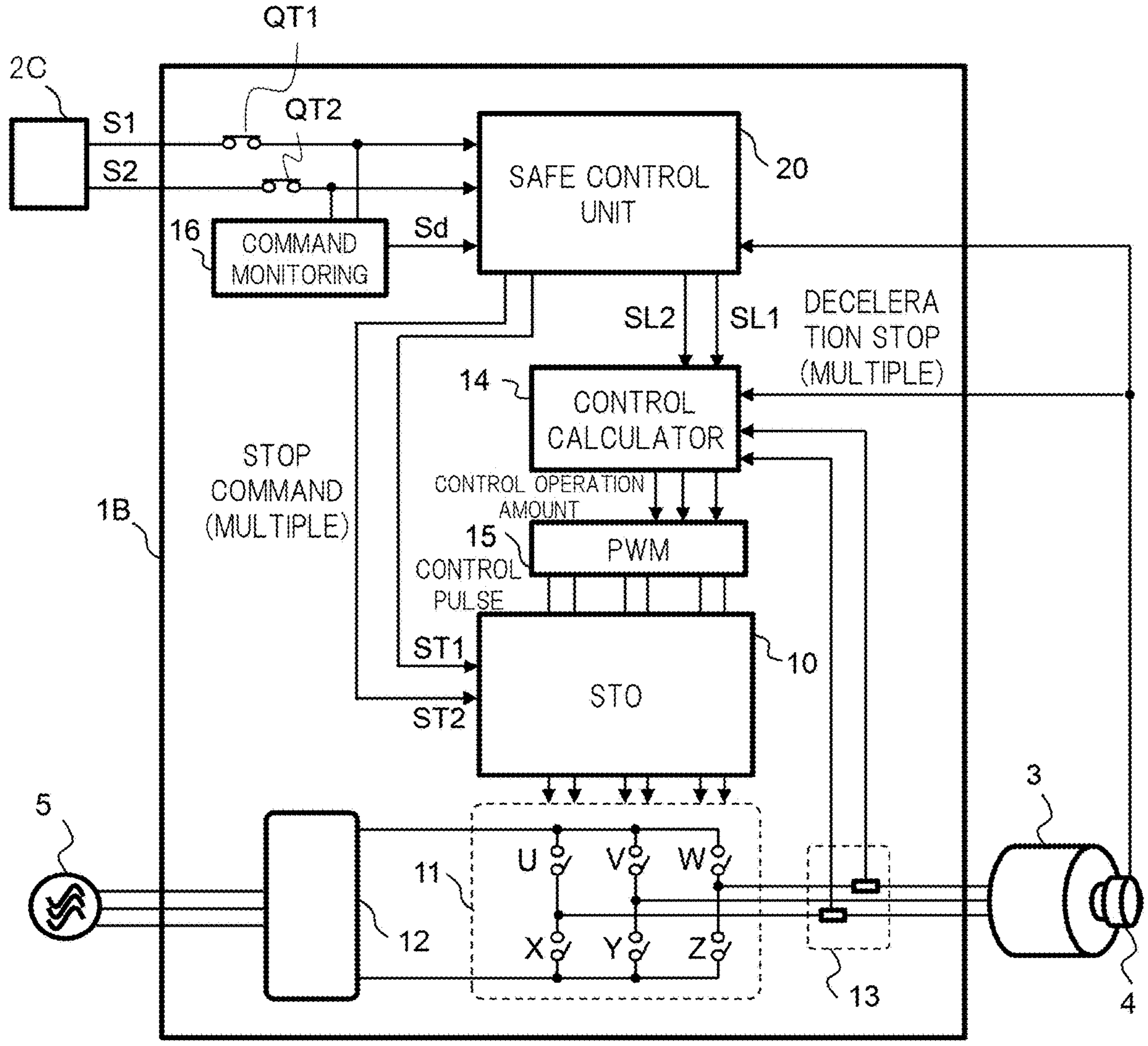
FIG. 7 is a circuit diagram for explaining a configuration of a motor controller according to a fifth embodiment of the present disclosure.

(3) Safety Monitoring Device (Indicated by Reference Numeral 16 in FIGS. 1, 5 and 7)

A safety monitoring device 16 is a device playing a role as a "command monitoring unit" monitoring that respective contents (commands, i.e., Lo/High states) of the multiple safety input signals S1 and S2 sent (inputted) from the external safety device 2 to the motor controller 1 (commands, i.e., Lo/High states) match each other. In the illustrated example, the safety monitoring device 16: inputs each of the multiple safety input signals S1 and S2 through branch lines of the signal lines to which the safety input signals S1 and S2 are transmitted; compares etc. the content (command) of the inputted signal to monitor and therefore diagnose it; and outputs a signal indicating a diagnosis result to the motor controller. Hereinafter, the signal indicating this diagnosis result will be referred to as "diagnosis protection signal Sd".

Hereinafter, description will be made on the following assumption: when the respective commands (Lo/High) included in the multiple safety input signals (S1, S2) outputted from the external safety device 2 match each other, the safety monitoring device 16 outputs the Lo signal as the diagnosis protection signal Sd and when they do not match each other, the safety monitoring device 16 outputs the High signal as the diagnosis protection signal Sd.

Next, the technical significance of the safety monitoring device 16 will be explained in relation to other devices. The motor controller 1 described in (1) normally sends a drive current to the motor 3, thereby controlling the motor 3 and therefore the processing device so as to perform operations and therefore functions according to the purpose etc. Hereinafter, this state may be referred to as a "normal operating state". Further, since the operations of the motor 3 and therefore the processing device in the normal operating state are well known, a detailed description thereof will be omitted.

On the other hand, the motor controller 1 performs control such as reduction or cutting-off of the drive current sent to the motor 3 when the stop command (for example, Lo signal) is inputted from the above (2), that is, the external safety device 2 to safely stop the motor 3 and the processing device. By performing such control, the motor 3 (processing device) can be shifted from a normal operation state to a safe stop (torque off or deceleration stop) state.

Note that, the significance of sending the multiple commands (safety input signals S1 and S2) from the external safety device 2 to the motor controller 1 is to enhance safety protection. More specifically, for example, in a case where the stop command and the execution command are sent from the external safety device 2 to the motor controller 1 through two signal lines, even if any trouble occurs and the above commands cannot be transmitted to one of the signal transmission systems (circuits, signal lines, and radio wave state in a case of wired, etc.), the command (safety input signal) can be transmitted through the remaining signal transmission system.

Therefore, when the safety input signal (S1 or S2) indicating the stop command is inputted from any of the signal transmission systems of the external safety device 2 in the above normal operation state, the motor controller 1 enters the safe stop state, performs the same control as that described above, and safely stops the motor 3 and the processing device. In this way, safety protection a is strengthened by adopting configuration in which the safe stop control is performed in accordance with the stop command inputted from any of the signal transmission systems.

On the other hand, as described above, if one of the signal transmission systems of the external safety device 2 fails and the processing device continues to operate while this is left unattended, the enhancement of the safety protection described above becomes a mere formality. In addition, if a further failure occurs in the external safety device 2, the motor controller 1 may be unable to control the safe stop. Such a case is likely to occur, for example, when the Lo signal is assigned to the execution command and the High signal is assigned to the stop command. For this reason, the following is premised on the reverse, that is, a configuration in which the High signal is assigned to the execution command and the Lo signal is assigned to the stop command as the safety input signals S1 and S2. With such a configuration, when trouble such as disconnection etc. occurs in one of the signal transmission systems, the signal (command) of the signal transmission system becomes Lo, so that it is conceivable that there is an advantage of facilitating detection of the occurrence of various troubles.

On the other hand, even if there are no disconnection etc. in all of the signal transmission systems of the external safety device 2 and the safety input signals S1 and S2 (Lo/High commands) are generally sent normally, a phase (for example, timing to switch to the stop command from the execution command) may occur. In this case, the motor controller 1 performs the safe stop control in response to the earlier sent stop command from the safety point of view. However, if the stop command signal to which the response is made is an erroneous signal based on a malfunction etc. of the external safety device 2, disadvantages associated with the timing of performing the safe stop being too early (e.g., lowering etc. an operation rate and productivity of the processing device) may occur.

Therefore, in the processing device system, it is necessary to provide a device for monitoring and diagnosing that the multiple commands (Lo/High) sent (inputted) from the safety monitoring device 16 described above in (3), that is, the external safety device 2 to the motor controller 1 mutually match each other.

In other words, the safety monitoring device 16 is a device responsible for monitoring and therefore diagnosing whether the external safety device 2 is operating normally. Hereinafter, when the respective commands (Lo/High) of the multiple safety input signals S1 and S2 sent (inputted) from the external safety device 2 to the motor controller 1 match each other, the safety monitoring device 16 determines that the external safety device 2 is operating normally, and outputs the Lo signal (diagnostic protection signal Sd=Lo).

Further, when the commands (Lo/High) of the multiple safety input signals S1 and S2 sent (inputted) from the external safety device 2 to the motor controller 1 do not match each other, the safety monitoring device 16 determines that the external safety device 2 or the transmission system is not operating normally, and outputs the High signal (diagnostic protection signal Sd=High).

Note that, conventionally, the safety monitoring device as described above has been used as an exterior device similar to the external safety device 2, that is, as the external device of the motor controller 1, exclusively during maintenance of the processing device system, thereby diagnosing whether each part is in the normal operation. As such a safety monitoring device, for example, a device using a signal monitoring method called EDM (External Device Monitoring) is known.

On the other hand, when the safety monitoring device is used as an external device of the motor controller 1, there is a problem in that wirings to the processing device system become complicated and, depending on the frequency of maintenance, wiring connection work becomes troublesome.

In view of the above problems, each embodiment described below adopts a configuration in which the safety monitoring device is mounted as an internal device of the motor controller 1. For convenience etc. of explanation, the safety monitoring device 16 will be replaced with a safety monitoring unit 16 in the following description.

First Embodiment

FIG. 1 is a diagram illustrating a configuration example of a motor controller according to a first embodiment of the present disclosure. A configuration example for controlling a three-phase AC motor will be described below as a specific example, but the present invention is not limited to this and can be applied to control of various other motors.

In addition, safety functions of mechanical drive systems using motors are defined in multiple international standards (typically IEC61800-5 group). The present invention can be applied to safety functions. First and second embodiments described below will be described on the assumption that safe torque off (STO), which is an example of a safe stop operation, is controlled.

As shown in FIG. 1, this motor controller 1 is connected to an external safety device 2, a motor 3, and a three-phase AC main power supply 5 (hereinafter simply referred to as AC main power supply 5). Various blocks (circuits) are provided to control the motor 3 (an encoder 4 is provided to a shaft of the motor 3).

Here, main functional blocks (circuits) included in the motor controller 1 are a safe torque off circuit (STO) 10, a three-phase inverter 11, an AC/DC conversion circuit 12, a current detector 13, and a motor control calculator 14, a control pulse generator (PWM) 15, and a safety monitor 16.

Connections with External Blocks Etc.

Among the above, the AC/DC conversion circuit 12 is connected to the AC main power supply 5, converts a three-phase AC input from the AC main power supply 5 into DC, and feeds the converted DC power supply into the three-phase inverter 11. The AC main power supply 5 is, for example, an external power supply such as a commercial three-phase 200V AC.

The three-phase inverter 11, as shown in FIG. 1, includes a switch circuit having six switches (U, V, W and X, Y, Z) whose ON/OFF can be switched, and is connected to three terminals of the motor 3 via those switches.

Three phases of the three-phase inverter 11 are hereinafter referred to as U-phase, V-phase, and W-phase, respectively. Symbols U, V, and W are respectively assigned to the upper switches (arms) in the FIG. 1 of the three-phase inverter 11, and symbols X, Y, and Z are respectively assigned to each of the lower switches (arms) in the figure.

The switches U, V, and W of each phase of the three-phase inverter 11 are connected in parallel to an output line of one pole (for example, a positive pole) of the AC/DC conversion circuit 12 and are connected to a corresponding phase (terminal) of the motor 3. The switches X, Y, and Z of the three-phase inverter 11 are connected in parallel to an output line of the other pole (for example, a negative pole) of the AC/DC conversion circuit 12 and are connected to a corresponding pole (terminal) of the motor 3. Further, the switch U and the switch X are connected in series with each other and are connected to the same pole of the motor 3 (the lowest terminal in FIG. 1). Similarly, the switch V and the switch Y are connected in series with each other and are connected to the same pole of motor 3 (a second terminal from the top in FIG. 1). Similarly, the switch W and the switch Z are connected in series with each other and are connected to the same pole of motor 3 (a top terminal in FIG. 1).

The three-phase inverter 11 having such switch circuits (a plurality of switches) can be realized by power semiconductors. The three-phase inverter 11 performs a switching operation of selectively turning on the switch U/X, the switch V/Y, and the switch W/Z according to a control pulse signal outputted from the control pulse generator 15 via a safe torque off circuit (STO) 10, thereby generating a three-phase AC current. The AC current after such a switching operation is sent to the motor 3 as a drive current, thereby rotating the motor 3 and operating the corresponding processing device.

Based on a basic program and various input signals, the motor control calculator 14 calculates a control operation amount for feedback-controlling the operation of the motor 3, generates a control signal indicating the calculated control operation amount, and outputs a control signal to a control pulse generator ("PWM" block in FIG. 1) 15.

More specifically, the motor control calculator 14 detects a drive current (voltage waveform etc.) supplied to the motor 3 through the current detector 13 arranged at any two of the three poles of the motor 3. Further, the motor control calculator 14 detects a rotation direction, a rotation speed, and a rotation position of the motor (a phase of a rotation shaft) of the motor 3 through an encoder 4 attached to the rotation shaft of the motor 3. In addition, the motor control calculator 14 can input and detect user's operation instructions through an operation input unit (not shown) including switches, levers, and the like of the processing device.

Then, based on the various input signals described above, the motor control calculator 14 calculates a difference (error) between the above detection result and the defined operation of the motor 3 (pre-defined rotation direction, rotation velocity, and phase). Then, the motor control calculator 14 calculates a control operation amount (here, form of the three-phase AC current to be supplied) that allows the motor 3 to operate without error corresponding to the basic program and the user's operation instruction, and outputs a control signal indicating a calculation result (hereinafter also simply referred to as a "control operation amount") to the control pulse generator 15.

The control pulse generator 15 performs PWM (Pulse Width Modulation) modulation on the inputted control signal, and outputs a control pulse signal, whose pulse width is modulated, to the safe torque-off circuit 10. The control pulse generator (PWM) 15 converts the pulse width according to magnitude of the inputted control operation amount, and passes through a plurality of signal lines (three phases× two poles=six in this example) to generate a control pulse signal from each signal line. The control pulse generator (PWM) 15 outputs the generated control pulse signal to the three-phase inverter 11.

The control pulse generator 15 shown in FIG. 1 compares, as a pulse generation method, a triangle-wave-shaped carrier and a control operation amount inputted from the motor control calculator 14, and uses a pulse width modulation method for generating pulses based on these magnitude relationships. Alternatively, the pulse generation method generated (outputted) by the control pulse generator 15 may be, for example, a pulse frequency modulation method that adjusts the pulse generation interval based on the magnitude of the control operation amount. Alternatively, as a pulse generation method generated (outputted) by the control pulse generator 15, the on/off state of each switch (U, V, W, X, V, Z) of the three-phase inverter 11 is defined by vector coordinates. Alternatively, a method of selecting a predetermined vector for each instantaneous value of the control operation amount may be used.

The motor control calculator 14 and the control pulse generator 15 can be implemented by a microcomputer or the like on which a control program is implemented, or by an analog/digital circuit. The same is true for the safe torque-off circuit 10 and the safety monitoring unit 16, but when configuring a safety system, blocks related to safety functions should be configured separately from others in order to minimize the influence of other functional blocks. For example, only the safe torque-off circuit 10 may be an analog/digital circuit, and may be physically separated from hardware such as a microcomputer on which other functions (control program, etc.) are implemented.

A safe torque-off circuit (STO) 10 is a circuit that functions when safely stopping the motor 3 used in the motor controller 1. As shown in FIG. PWM) 15, safety monitoring unit 16, and three-phase inverter 11. Also, the safe torque off circuit (STO) 10 is connected to the motor control calculation block 14 via the control pulse generator (PWM) 15.

The safe torque-off circuit 10 of the motor controller 1 is located in the middle of the path for transferring the control pulse signal obtained by the control pulse generator 15 to the three-phase inverter 11, and receives a safety input signal separately inputted from the external safety device 2. The control pulse signal transfer is activated or interrupted based on the contents of the commands of S1 and S2.

In the present embodiment, the safe torque-off circuit 10 performs operations for transferring (supplying)/blocking the transfer (Supply Prohibited) of the control pulse signal supplied from the control pulse generator 15 to the three-phase inverter 11 according to the commands of the safety input signals S1 and S2.

Specifically, when both of the safety input signals S1 and S2 are execution commands, the safe torque-off circuit 10 determines that it is in a normal operation state, and transfers (supplies) the control pulse signal to the three-phase inverter 11.

On the other hand, when one of the safety input signals S1 and S2 is a stop command, the safe torque-off circuit 10 determines that a safe stop is necessary, and cuts off (prohibits) the transfer (supply) of the control pulse signal to the three-phase inverter 11. This cut-off (supply inhibition) operation causes the motor 3 to perform a safe torque off (hereinafter referred to as "STO") operation. More specifically, the STO operation of the motor 3 is realized by turning off the power semiconductor gate (corresponding to each switch shown in FIG. 1) that constitutes the three-phase inverter 11 by interrupting the control pulse signal.

In one specific example, the safe torque-off circuit 10 receives signals sent from the external safety device 2 and the safety monitoring unit 16 described above, both of the safety input signals S1 and S2 are High, and the diagnostic protection signal Sd is Lo, the control pulse signal input from the control pulse generator 15 is sent (transferred) to the three-phase inverter 11 as it is.

Therefore, according to this system, during normal operation of various devices to which the motor 3 is attached, the motor 3 rotates according to the type of the device and the user's operation, and the motor is controlled by feedback control. 3. As a result, it is possible to ensure the accuracy of the operation of the device.

On the other hand, the safe torque-off circuit 10 operates when at least one of the safety input signals S1 and S2 among the signals sent and inputted from the external safety device 2 and the safety monitoring unit 16 is Lo, or when the diagnosis protection signal Sd is High, the transfer of the control pulse signal input from the control pulse generator 15 is cut off (supply prohibited). In one specific example of this case, the safe torque-off circuit 10 switches off all the switches (U, V, W, X, Y, and Z) are turned off (see FIG. 1).

For convenience of explanation, the diagnostic protection signal Sd in the High state or the safety input signal S1 (S2) in the Low state may be referred to as a "current cutoff signal" hereinafter.

As can be understood from FIG. 1, the drive current is no longer supplied to the motor 3 by performing the safe stop control according to the output of the current cutoff signal as described above. In this case, the torque is turned off and the motor rotates only with the remaining power. In fact, due to the frictional resistance of the drive mechanism of various processing devices connected to the motor 3, the processing device will be quickly stopped by the torque off state of the motor 3.

By the way, the above-mentioned international standards (for example, IEC61508 or ISO13849) show the concept of constructing a safety system with dual inputs and dual outputs. A specific configuration of the blocks is not shown.

Therefore, the present inventor proposes specific configurations of the various blocks described above, as described below.

Figure 2:
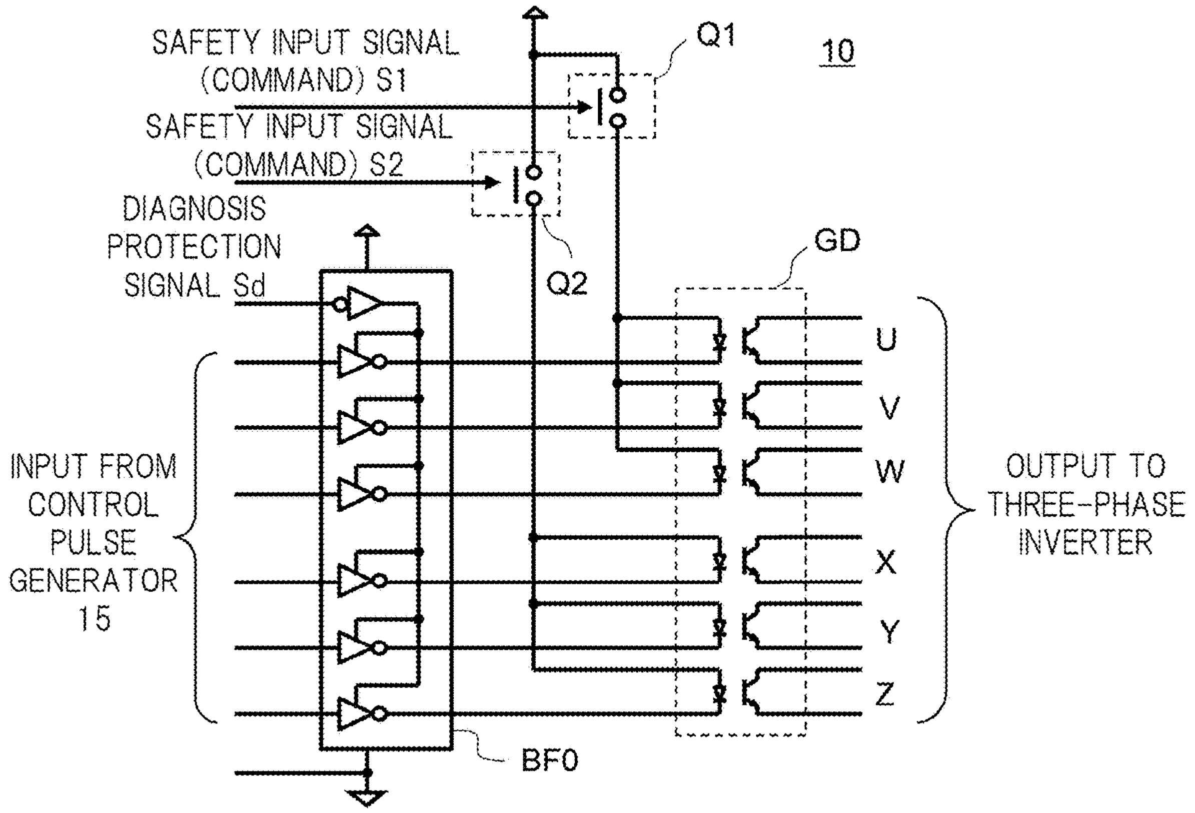
FIG. 2 is a circuit diagram showing one specific example of a safe torque off (STO) circuit of FIG. 1.

FIG. 2 is a circuit diagram showing a specific configuration example of the safe torque-off circuit 10. From another point of view, FIG. 2 is a diagram for explaining a specific example in which a drive current is not supplied to the motor 3 by inputting a current interruption signal to the safe torque-off circuit 10.

In the example shown in FIG. 2, the safe torque-off circuit 10 includes a buffer circuit BF0 having a plurality of buffer elements, a gate drive element GD having a plurality (six in this example) of photocouplers, an anode cutoff switch Q1, and Q2. In this example, one end side of the buffer circuit BF0 in the safe torque-off circuit STO10 is connected to a reference potential (common) corresponding to 0V. A power supply potential of a constant voltage power supply (not shown) is connected to the other end of the buffer circuit BF0 and one end of the anode cutoff switches Q1 and Q2.

From the standpoint of fail-safe, for example, in preparation for disconnection of the signal lines of the safety input signals S1 and S2, the signs and constants of the signals should be changed so that the motor controller 1 reaches the STO operation in the base state of this system. The level of the reference voltage applied by the voltage source may be chosen.

The buffer circuit BF0 determines whether or not to output control pulse signals inputted from the control pulse generation unit 15 through six signal lines (in other words, for six switches) to inputs of gate drive element GD. It plays a role of switching by the protection signal Sd.

Specifically, the buffer circuit BF0 includes (six) amplifying and inverting elements that amplify and invert the currents of the six signal lines to which the control pulse signal is inputted, and an inverting and amplifying element that inverts and amplifies the diagnostic protection signal Sd. Signal lines are connected to the buffer circuit BF0 so that the output of the inverting and amplifying element is inputted to each of the six amplifying and inverting elements (preceding stage of the inverting unit). Also, the outputs of the six amplifying and inverting elements are connected to the cathodes of the light emitting diodes in the optocouplers of the gate drive elements GD that operate the corresponding switches (U, V, W, X, Y, and Z) of the three-phase inverter 11.

In the state shown in FIG. 2, the anode cut-off switches Q1 and Q2 are off and no current is supplied to the light emitting diode of the gate drive element GD, so that no current is outputted from any photocoupler. As a result, the corresponding switches (U to Z) of the three-phase inverter 11 are also turned off (see FIG. 1 as appropriate), and no drive current is supplied to the motor 3.

Moreover, even if one anode cutoff switch Q1 (or Q2) is turned on based on the safety input signal (either S1 or S2) from the state shown in FIG. 2 and if the other anode cutoff switch Q2 (or A1) is off, no current is supplied to the light-emitting diode of the corresponding gate drive element GD and no current is outputted from the corresponding photocoupler. As a result, the corresponding three switches U, V, and W (or X, Y, and Z) of the three-phase inverter 11 are also in an off state, and no drive current is supplied to the motor 3.

Note that in the present embodiment, when only one anode cutoff switch Q1 (or Q2) is turned on for a certain period of time, the diagnosis protection signal Sd goes high, causing all the switches (U to Z) of the three-phase inverter 11 to turn on are turned off, and no drive current is supplied to the motor 3. A specific circuit configuration and the like for realizing this operation will be described later with reference to FIG. 3.

On the other hand, when both anode cutoff switches Q1 and Q2 are turned on based on the safety input signals S1 and S2 from the state shown in FIG. 2, a current from a constant voltage power supply becomes in a state of being capable of being supplied to all the light-emitting diodes of the gate drive element GD. In this case, the presence or absence of light emission of each light-emitting diode of the gate drive element GD and therefore the ON/OFF state or switching of the corresponding switches (U to Z) of the three-phase inverter 11 according to the output current of each photocoupler is determined by the output (Lo/High) from the corresponding amplifying and inverting element of the buffer circuit BF0.

In this example, when a High signal is inputted from the control pulse generator 15 and a Lo signal is outputted from the amplifying/inverting element of the buffer circuit BF0, the corresponding light-emitting diode of the gate drive element GD emits light, the current is outputted from the corresponding photocoupler, and the corresponding switch (any one of U to Z) of the three-phase inverter 11 is turned on. Conversely, when a Lo signal is inputted from the control pulse generator 15 and a High signal is outputted from the amplifying/inverting element of the buffer circuit BF0, the corresponding light-emitting diode of the gate drive element GD does not emit light, and the current from the corresponding photocoupler is not outputted, and the corresponding switch (any one of U to Z) of the three-phase inverter 11 is turned off.

Furthermore, when the diagnosis protection signal Sd inputted to the enable terminal (inverting amplifying element) is High, it is inverted to a Lo signal by the inverting amplifying element, and the Lo signal is inputted to all the amplifying and inverting elements of the buffer circuit BF0. Outputs of all amplifying and inverting elements become High due to the inverting process. As a result, none of the light-emitting diodes of the gate drive element GD emit light, none of the photocouplers output the current, and all switches (U to Z) of the three-phase inverter 11 are turned off.

Thus, according to the circuit configuration shown in FIG. 2, based on the safety input signals S1 and S2 (instructions), the current can be supplied to all the light-emitting diodes, and the diagnosis protection signal Sd is Lo. (In other words, the drive current is supplied to the motor 3 on condition that the safety stop command is not sent).

On the other hand, when any photocoupler of the gate drive element GD is in the ON state and the diagnostic protection signal Sd inputted to the inverting amplifier element of the buffer circuit BF0 becomes Hi, the signal of Hi applied by inverting amplification becomes Lo and is inputted to each amplifying/inverting element of the buffer circuit BF0. As a result, the output of the control pulse signal inputted from the control pulse generator 15 through each signal line to the subsequent stage (gate drive element GD) is blocked, and all the photocouplers of the gate drive element GD are turned off. Therefore, in this case, all the switches (U to Z) of the three-phase inverter 11 are in an off state (see FIG. 1 as needed), and the drive current is not supplied to the motor 3 (cut off).

Thus, according to the circuit example shown in FIG. 2, a plurality of (six in this example) pulse signals outputted from the control pulse generator 15 pass through the buffer element BF0 and the gate drive element GD in order to the three-phase inverter 11, respectively. Then, the three-phase inverter 11 transmits (supplies) the alternating current to the motor 3 connected to the outside of the motor controller 1 by switching the built-in power semiconductor.

Note that when the diagnosis protection signal Sd is lost, the enable terminal of the buffer element BF0 is turned off and, as a result, the light emission of the light-emitting diodes of all the photocouplers (U to Z) of the gate drive element GD is cut off. In addition, the configuration is such that the safe torque off of the motor 3 can be realized.

Modifications Etc.

The buffer element BF0 may be a multi-channel element. Also in this case, an enable terminal capable of turning ON/OFF the output of each channel of the buffer element BF0 may be provided, and the diagnosis protection signal Sd may be inputted to the enable terminal.

As for the gate drive element GD, a circuit configuration using a photocoupler has been described with reference to FIG. 2. As another example, the gate drive element GD is an element capable of switching between transfer/transfer inhibition (blocking) of each pulse signal inputted from the control pulse generator 15, such as an optical coupler or an element incorporating a magnetic coupler. Furthermore, as another example, the gate drive element GD is not limited to a configuration in which each pulse signal inputted from the control pulse generator 15 is transferred as it is, and each pulse signal is transferred to each gate of the three-phase inverter 11. It may be a circuit that converts to various digital signals for driving the switches (U to Z).

Safety Monitoring Unit

Figure 3:
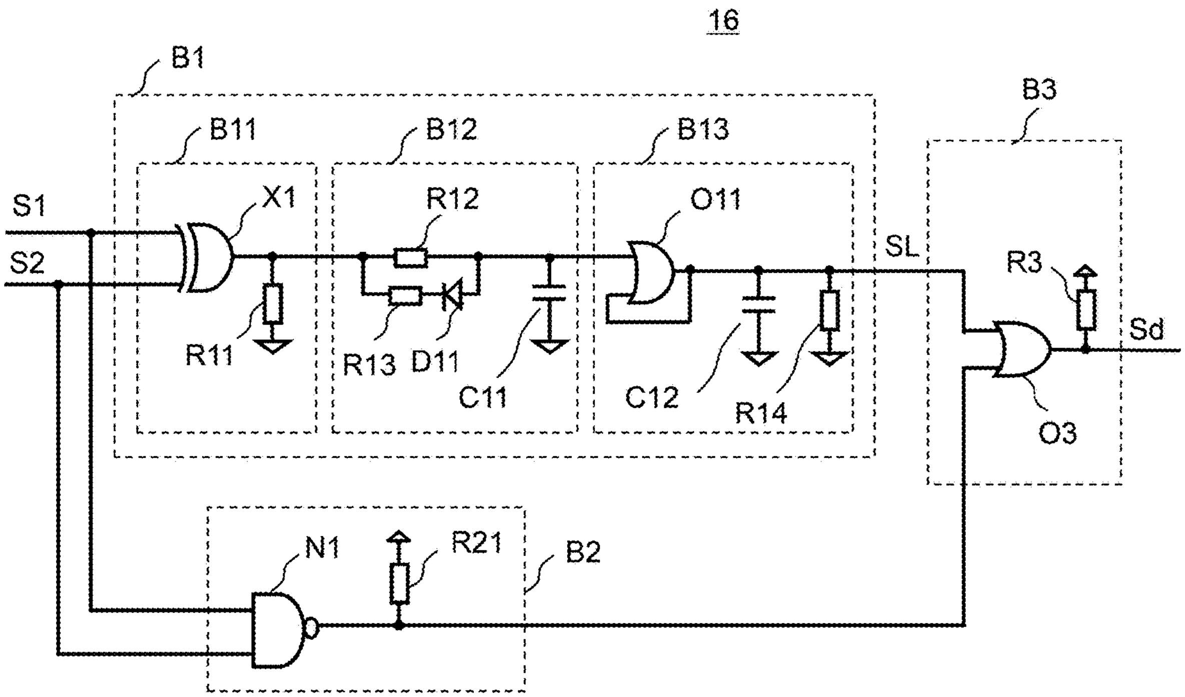
FIG. 3 is a circuit diagram showing one specific example of a safety monitoring circuit of FIG. 1.

FIG. 3 shows a specific example of a circuit that constitutes the safety monitoring unit 16 of the present disclosure. Note that the logic elements in the figure are connected to a constant voltage source (not shown) when driven as an actual circuit, but the description of the constant voltage source is omitted because it does not affect the description of the function.

The safety monitoring unit 16 shown in FIG. 3 branches the safety input signals S1 and S2 sent from the external safety device 2 in parallel to a first processing block B1 and a second processing block B2, respectively, and performs a calculation processing to it. Then, the safety monitoring unit 16 performs a logical sum (OR) operation on the operation output of the first processing block B1 and the operation output of the second processing block B2 in the third processing block B3 to generate and output a diagnosis protection signal Sd.

The first processing block B1 of the safety monitoring unit 16 is configured by sequentially connecting an XOR unit B11, a charging/discharging unit B12, and a latch unit B13 in series from the preceding stage.

Of these, the XOR unit B11 includes the safety input signal S1 and the safety input signal S2, detects whether there is a difference in the polarity of High/Low of these signals, and if there is a difference, outputs a High signal to the subsequent stage, outputs the High signal to the subsequent stage. The XOR unit B11 corresponds to the "comparison unit" of the present disclosure. For example, as shown in FIG. 3, the XOR unit B11 can be configured to include an XOR element X1 that performs a logical XOR operation of the safety input signal S1 and the safety input signal S2, and a resistor R11 that pulls down the result of the operation (that is, the output of the XOR element X1). Here, the pull-down resistor R11 corresponds to the "first resistor" of the present disclosure.

Note that hereinafter, a resistor having the same function will be referred to as a "pull-down resistor", and a resistor that plays the opposite role of pulling up the output will be referred to as a "pull-up resistor".

One end of the pull-down resistor R11 is connected to the output ends of the XOR element X1 and the XOR unit B11, and the other end of the pull-down resistor R11 is connected to the reference potential. Such a pull-down resistor R11 has a role of, for example, lowering the output potential of the XOR unit B11 to the reference potential when the safety monitoring unit 16 is activated, and stabilizing the output value. The same is also applied to the pull-down resistance 14 of the latch unit B3 described later.

Next, the charging/discharging unit B12 plays a role of a timer that stores information on duration of the difference by charging the high current output when the difference is detected by the XOR unit B11. Such a charging/discharging unit B12, for example as shown in FIG. 3, may be configured to have a RC first delay filter circuit (RC time constant circuit) connected to the resistance R1 and the capacitor C11 (mutually in serious).

Here, the resistor R12 corresponds to the "second resistor" of the present disclosure. One end of the resistor R12 is connected to the output end of the XOR element (X1), and the other end of the resistor R12 is connected to the output end of the charging/discharging unit B12.

Further, the capacitor C11 has a role of charging and discharging the current supplied to the charging/discharging unit B12, and one end (positive voltage terminal) of the capacitor C11 is connected to the other end of the resistor R12 and the output terminal of the charging/discharging unit B12, and the other end of the capacitor C11 is connected to the reference potential.

Further, in the example shown in FIG. 3, a circuit of series-connected diode D11 and resistor R13 (hereinafter also referred to as a diode circuit) is connected in parallel from the output side of the resistor R12 to the input side thereof. Here, the resistor R13 corresponds to the "third resistor" of the present disclosure. The magnitude relationship between the resistance values of the resistor R12 (second resistor) and the resistor R13 (third resistor) is R12>R13.

The above diode circuit does not function when charging the capacitor C11 (the circuit with only the resistor R12 functions), and functions as a parallel resistance circuit of the resistors R12 and R13 when discharging the capacitor C11. Therefore, the difference in the resistance values of the resistors R12 and R13 allows the charging and discharging currents (time constants) to be adjusted to different values.

The charging/discharging unit B12 having such a configuration charges the capacitor C11 (charge accumulation) when the output of the preceding XOR unit B11 changes from Low to High (in other words, when there is a difference between the signals S1 and S2), the charging (charge accumulation) to the capacitor C11 is started. Then, when the output of the XOR unit B11 returns to Low before the charge accumulated in the capacitor C11 reaches the threshold (in other words, when there is no difference between the signals S1 and S2), the charge/discharge unit B12 resets the capacitor C11 (in other words, the timer) by discharging the charge accumulated in the capacitor C11 to the resistors R11, R12, and R13.

On the other hand, in the charging/discharging unit B12, when the output of the XOR unit B11 remains High for a certain period of time, charges are accumulated in the capacitor C11 and the voltage of the capacitor C11 gradually approaches the output voltage of the XOR unit B11.

Furthermore, the latch unit B13 has a function of determining whether or not the voltage of the capacitor C11 exceeds a predetermined voltage threshold, and holding (continuously outputting) the determination result as a High state output when the voltage exceeds the predetermined voltage threshold. If the voltage of the capacitor C11 is regarded as a timer, this action can be said to have the same effect as determining whether or not the duration of the difference between the safety input signal S1 and the safety input signal S2 has exceeded a predetermined time limit. Note that the charge/discharge unit B12 and the latch unit B13 correspond to the "latch unit" of the present disclosure. Also, hereinafter, the output of the latch unit B13 will be referred to as a signal SL.

For example, as shown in FIG. 3, the latch unit B13 includes a logic OR element O11 and a pull-down resistor R14 that pulls down the output of the logic OR element O11.

Optionally, the latch unit B13 also includes a capacitor C12 that accumulates (charges and discharges) the output of the logic OR element O11. In the latch unit B13, one input of the OR element O11 is connected to the output terminal of the timer unit B12 and the voltage terminal (positive voltage terminal) of the capacitor C11, and the other input of the OR element O11 is configured by a direct feedback circuit the output of the OR element O11. Whether or not the voltage of the capacitor C11 exceeds the threshold is determined using the high-level voltage, which is the characteristic value of the logical OR element O11 as a threshold.

A second processing block B2 detects (determines) when both the safety input signal S1 and the safety input signal S2 indicate an operation permission state (for example, High) of the motor 3, and outputs the detection result (if operation permission state, Lo). For example, as shown in FIG. 3, the second processing block B2 is configured by a NAND element N1 for calculating a logical NAND of the safety input signal S1 and the safety input signal S2, a resistor R21 for pulling up the output of the NAND element N1.

The third processing block B3 includes an OR element O3 that performs a logical sum (OR operation) of input signals, and a pull-up resistor R3 connected to the output terminal of the OR element O3 and the output side of the third processing block B3. The input end of the OR element O3 is connected to the output terminal of the first processing block B1 and the output terminal of the second processing block B2, respectively.

Thus, the safety monitoring unit 16 OR-operates the output of the first processing block B1 and the output of the second processing block B2 using the OR element O3 of the third processing block B3, and outputs the result of the OR operation (Lo or High) as the diagnostic protection signal Sd. Then, the low or high diagnostic protection signal Sd outputted from the safety monitoring unit 16 is inputted to the enable terminal of the buffer element BF0 (see FIG. 2) in the safe torque-off circuit 10 in the subsequent stage.

In the following description, it is assumed that the motor 3 is allowed to operate when the diagnostic protection signal Sd is in the Lo state. In this case, the first processing block B1 outputs a Lo signal by operating the pull-down resistors R11, R14, etc. at startup. After that, in the first processing block B1, a difference occurs between the safety input signal S1 inputted from the external safety device 2 and the safety input signal (the output of the XOR unit B11 becomes High), and the difference becomes a predetermined value. When the time elapses, the high diagnostic protection signal Sd is continuously outputted.

The output of the second processing block B2 will be Lo when both the safety input signals S1 and S2 are High (operation permitted state). Also, the third processing block B3 outputs the logical OR of the output of the first processing block B1 and the output of the second processing block B2 as the diagnosis protection signal Sd.

Therefore, the safety monitoring unit 16 outputs a signal different from the normal signal (detects an abnormality between the signals S1 and S2) only when the first processing block B1 determines that the difference has continued for a certain period of time.

As described above, in this embodiment, the drive current is sent to the motor 3 to bring the motor 3 and the processing device into the normal operation state, and the safety input signal S1 and S2 (multiplexed commands) related to the safety function operation of the processing device sent from the external safety device 2, the motor controller (A safety monitoring unit 16 (command monitoring unit) is built in.

Then, as described in detail with reference to FIG. 3, the safety monitoring unit 16 generates the safe stop command (diagnostic protection signal Sd=High) for causing the motor 3 to safely stop (STO) when the period in which the safe input commands S1 and S2 do not match each other exceeds the allowable value, and sends the generated safe stop command (High diagnostic protection signal Sd) to the motor control unit (safe torque off circuit 10).

Specifically, the safety monitoring unit 16 (command monitoring unit) includes an XOR unit B11 (comparison unit) that compares the respective safety input signals S1 and S2 (command) and outputs the difference as a High signal, and a power storage unit (charging/discharging unit B12) that accumulates electric charge, and a safe stop command generator (charging/discharging unit B12, latch unit B13) that generates and outputs a safety stop command (High diagnostic protection signal Sd) when the voltage of the power storage unit exceeds a threshold value.

In the motor controller 1 of the present embodiment having the safety monitoring unit 16 as described above, the safety input signal S1 and the safety input signal S2 are inputted and compared with each other, and one of these two inputs (S1, S2), the abnormality can be detected and STO of the operation of the motor 3 can be operated.

Further, according to the present embodiment in which the safety monitoring unit 16 is incorporated as an internal device of the motor controller 1, it is possible to monitor whether the external safety device 2 is operating properly without using an external monitoring device. In other words, monitoring can be performed without wiring. Therefore, there is an advantage that the safety design of the motor controller 1 and the processing device system as a whole, which incorporates a monitoring function for monitoring multiple safety input signals and detecting anomalies, is facilitated.

Furthermore, the power storage unit (charging/discharging unit B12) of the safety monitoring unit 16 (command monitoring unit) secures the time from when the XOR unit B11 (comparing unit) outputs a High signal until the voltage of the capacitor C11 exceeds the threshold. An RC time constant circuit (R12 and C11) is provided to charge capacitor C11 as follows. The safety stop command generation unit also includes a latch unit B13 that holds the output of the safety stop signal (High diagnostic protection signal Sd) when the voltage of the capacitor C11 exceeds the threshold (discharged from the capacitor C11).

The RC time constant circuit (R12 and C11) as described above can perform the same function as a general timer that measures time based on a clock signal, for example, and can be realized at low cost.

From another point of view, the safety monitoring unit 16 (command monitoring unit) sends the multiplexed commands (safety input signals S1, S2) to the first processing block B1 (first signal processing unit) and the second processing block B1 (first signal processing unit), respectively, and is branched in parallel to the signal processing unit B2 (second signal processing unit), and based on the logical sum (OR) of the calculation output of the first processing block B1 and the calculation output of the second processing block B2. The following diagnostic protection signal Sd is outputted to the circuit 10 (motor controller) with respect to the safe torque off.

That is, the safety monitoring unit 16 uses the above-described timer function to send Lo as the diagnostic protection signal Sd when the period in which the safety input signals S1 and S2 (multiplexed commands) do not match each other does not exceed the allowable value. Then, when the period of non-coincidence exceeds the allowable value, Hi (safety stop command) is sent as the diagnosis protection signal Sd.

As a specific example of the circuit configuration for outputting the diagnosis protection signal Sd as described above, the first processing block B1 (first signal processing unit) includes an XOR unit B11, a charge/discharge unit B12, and a latch unit B13. are serially connected in order, and the second processing block B2 (second signal processing unit) is provided with a NAND unit that performs NAND operations on the safety input signals S1 and S2 (multiplexed commands) and outputs them.

Specifically, the XOR unit B11 includes an XOR element X1 that outputs an exclusive OR of the safety input signals S1 and S2 (multiplexed instructions), and a first resistor (R11) that pulls down the output of the XOR element X1.

The charge/discharge unit B12 is an RC time constant circuit composed of a second resistor (R12) one end of which is connected to the output end of the XOR element X1, and a capacitor C11 connected to the other end of the second resistor (R12), and charges the capacitor C11 when the output of the XOR element X1 is High, and discharges the capacitor C11 when the output of the XOR element X1 is Low.

Further, the latch unit B13 includes an OR element O11 whose first input terminal is connected to the output terminal of the RC time constant circuit (R12, C11), and a pull-down resistor (R14) that pulls down the output of the OR element O11, and the output of the OR element O11 is directly connected to the second input terminal of the OR element O11.

Furthermore, the NAND unit B2 of the second processing block B2 (second signal processing unit) includes a logical NAND element (N1) for calculating and outputting a negative logical product (NAND) of the commands (S1, S2), and a resistor (R21) that pulls up the output of the logic NAND element (N1).

With the circuit configuration described above, it is possible to switch between Lo and Hi (safety stop command) of the diagnostic protection signal Sd. Further, by adopting the circuit configuration described above, it is possible to provide ancillary functions for coping with various technical problems to be described later.

As described above, according to the present embodiment, a motor control system such as an inverter circuit for driving and controlling the motor 3 is equipped with a monitoring function of a multiple system safety system and a protection function according to the monitoring result. It is possible to more easily construct a safety system in a system of industrial machines such as processing device that uses the motor 3.

The main circuit configuration and operation of the safety monitoring unit 16 shown in FIG. 3 have been described above. Next, ancillary functions of the safety monitoring unit 16 shown in FIG. 3 and advantages obtained from the functions will be described.

Construction Corresponding to Problems in Charge/Discharge Unit B12

When the safety input signal S1 and the safety input signal S2 are inputted to the first processing block B1 of the safety monitoring unit 16, the XOR unit B11 outputs the output of the XOR element X1 (High/Lo) may be switched frequently. Such a case is, for example, a case where the difference between these two safety input signals repeatedly (S1, S2) occurs instantaneously due to some factor such as an error or minute noise.

Thus, when the frequency of switching the output (High/Lo state) of the XOR element X1 is high, depending on the configuration of the capacitor C11 in the subsequent charging/discharging unit B12, particularly when the discharge time constant of the capacitor C11 is large, the following problems may occur. That is, since the time for which the output of the XOR element X1 remains in the Lo state is shortened, the charge in the capacitor C11 of the charging/discharging unit B12 is not sufficiently discharged, and the output of the XOR element X1 repeatedly becomes High, so that the voltage rise characteristics of C11 may become uneven.

In order to deal with the above problem, it is required to improve the discharge characteristics of the capacitor C11 in the charging/discharging unit B12. Also, in order to improve the discharge characteristics while maintaining the accuracy of the timer measurement time described above, it is necessary to make the discharge time constant smaller than the charge time constant of the capacitor C11.

Regarding this problem, in this embodiment, as shown in FIG. 3, a configuration in which the anode side of D11 is connected to capacitor C11 is adopted.

According to this configuration, the resistance value of the resistor R11 of the XOR unit B11 and the resistance value of the resistor R13 of the charging/discharging unit B12 are sufficiently smaller than the resistance value of the resistor R12 of the charging/discharging unit B12. The discharge time constant can be made smaller than the constant, and the discharge time can be shortened.

Therefore, according to the circuit configuration of the first processing block B1 in this embodiment, it is possible to improve the discharge characteristics of the capacitor C11 while maintaining the accuracy of the timer measurement time described above. Further, according to this circuit configuration, even when the frequency of switching the output (High/Lo state) of the XOR element X1 is high, the voltage rise characteristic of the capacitor C11 can be maintained.

Problems in Latch Unit B13 and Corresponding Configuration

The logical OR element O11 of the latch unit B13 has a circuit configuration in which once the output is set to High, it continues to output High.

Regarding this problem, as shown in FIG. 3, this embodiment employs a configuration in which a capacitor C12 is connected in parallel to the output of the OR element O11. With such a configuration, when noise or the like is mixed, the noise component can be absorbed by the capacitor C12, so that malfunction caused by the noise or the like can be prevented or suppressed.

Second Embodiment

Figure 4:
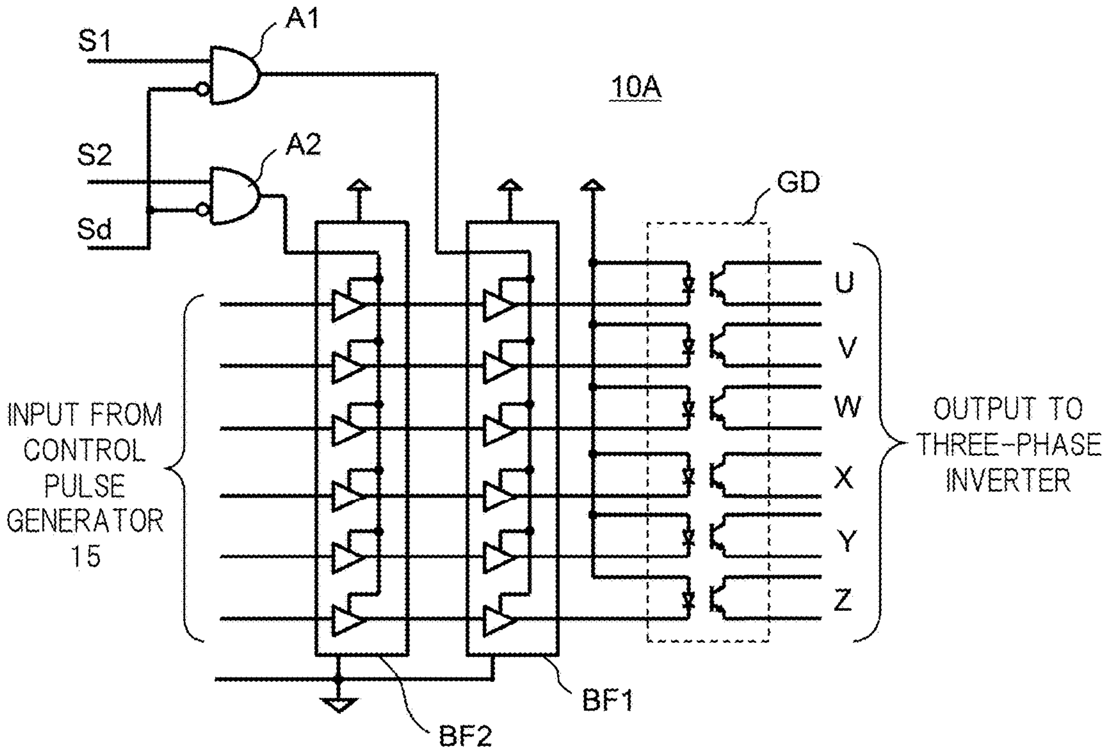
FIG. 4 is a circuit diagram showing an example of a safe torque-off circuit according to a second embodiment of the present disclosure.

FIG. 4 is a configuration example of a safe torque-off circuit according to a second embodiment of the motor controller of the present disclosure. The configuration shown in FIG. 4 is an alternative to the safe torque off circuit 10 shown in FIG. 2 described above.

In the following, matters different from the safe torque-off circuit 10 shown in FIG. 2 will be described, and the same reference numerals will be assigned to the same configurations, and the description thereof will be omitted as appropriate. Similarly, the description of the constant voltage source connected to the logic element is omitted.

As understood by comparing FIGS. 2 and 4, the safe torque-off circuit 10A shown in FIG. 4 has the anode cutoff switches Q1 and Q2 removed from the configuration shown in FIG. 2, a logical AND element A1 and a logical AND element A2 have been added.

In general, the main difference between the safe torque-off circuit 10A shown in FIG. 4 and the configuration shown in FIG. 2 is series connection of the buffer element BF1 and buffer element BF2. With such a configuration, the safe torque-off circuit 10A shown in FIG. 4 can achieve redundant safe torque-off.

Similarly to the configuration shown in FIG. 2, the safe torque-off circuit 10A is configured so that the STO operation can be performed by the diagnostic protection signal Sd being branched and being connected to each other.

In the example shown in FIG. 4, the output terminals of the logic AND elements A1 and A2 are connected to the enable terminals of the buffer elements BF1 and BF2 to which the diagnosis protection signal Sd is inputted. Signal lines for the safety input signal S1 and the safety input signal S2 are connected to one ends of the inputs of the logic AND element A1 and the logic AND element A2. Further, the other terminals of the inputs of the logical AND element A1 and the logical AND element A2 are respectively provided with inverting portions so that the inverted signal of the diagnosis protection signal Sd is inputted (see FIG. 4 as appropriate).

According to the safe torque-off circuit 10A configured as described above, when the operation is similar to that of FIG. 2, that is, when the safe input signal S1 and the safe input signal S2 are High and the diagnosis protection signal Sd is Lo, the signal on a motor operation allowable state is outputted from the buffer element BF1. The operation of each signal (S1, S2, Sd) other than the above is the same as in the case of FIG. 2, and a detailed description thereof will be omitted.

Third Embodiment

FIG. 5 is an example of a motor controller according to a third embodiment of the motor controller of the present disclosure. The motor controller 1A shown in FIG. 5 not only monitors the difference between the safety input signal S1 and the safety input signal S2 by the safety monitoring unit 16, but also checks whether the safety monitoring unit 16 that performs such monitoring functions normally. Differences from the motor controller 1 described above with reference to FIG. 1 will be described below.

In the third embodiment, it is assumed that a monitor device 2B such as an image display is used as an external device of the motor controller 1A. Note that reference numeral 2A in FIG. 5 is equivalent to the external safety device 2 shown in FIG. 1.

The motor controller 1A of the third embodiment includes test switches QT1 and QT2 capable of blocking transmission of the respective signals (S1 and S2) on the transmission paths of the safety input signal S1 and the safety input signal S2. In the state shown in FIG. 5, these test switches QT1 and QT2 are both ON. Further, in the third embodiment, the ON/OFF of these test switches QT1 and QT2 can be operated by the motor control calculator 14A. Further, the motor control calculator 14A of the third embodiment is configured to detect the state of the diagnostic protection signal Sd outputted from the safety monitoring unit 16.

Specifically, the motor control calculator 14A additionally includes an operation unit 142 that outputs a signal for turning on/off the test switches QT1 and QT2. This operation unit 142 has a function of operating so that at least one of the multiple commands (S1, S2) is not sent to the motor control unit (safe torque off circuit 10 in this example).

The motor control calculator 14A also includes a notification unit 141 that notifies the external monitor device 2B of the diagnosis protection signal Sd, the state of the device, etc. based on the diagnosis protection signal Sd transmitted from the safety monitoring unit 16. In the illustrated example, the diagnostic protection signal Sd outputted from the safety monitoring unit 16 is also inputted to the notification unit 141 and the operation unit 142. Other configurations (functions) of the motor control calculator 14A are equivalent to those of the motor control calculator 14 described above with reference to FIG. 1.

The significance and advantages of the circuit configuration shown in FIG. 5 will be described below. For example, in the configuration shown in FIG. 1, if the STO state occurs due to the action of the diagnostic protection signal Sd, although the motor 3 is in a torque-off state due to the STO operation, the cause (in this example, whether the diagnostic protection signal Sd is an effect or not) may not be able to be determined.

On the other hand, in the circuit configuration shown in FIG. 5, since the waveform of the diagnostic protection signal Sd and its transition can be notified to the external monitor device 2B and displayed on the monitor device 2B, there is an advantage that the system user can specify the cause.

Moreover, in the circuit configuration shown in FIG. 5, the test switches QT1 and QT2 are configured to be operated from the operation unit 142 provided in the motor control calculator 14A, so there is an advantage that the safety is further improved.

More specifically, for example, in a state in which the safety input signals S1 and S2 indicate permission to operate the motor, one of the test switches QT1 or QT2 is turned OFF intentionally (for example, by a user's operation) to turn off the safety input. By interrupting the transmission of one of the signals S1, S2, it is possible to check whether the diagnosis protection signal Sd correctly transitions to High. In other words, according to the circuit configuration shown in FIG. 5, it is possible to self-diagnose whether or not the safety monitoring unit 16 is normal, so that a more failure-free safety system can be constructed.

Although the test switches QT1 and QT2 shown in FIG. 5 are illustrated as physical switches that cut off the safety input, the polarity (high/high/high) of the safety input signals S1 and S2 such as pull-down/pull-up are also possible. A similar self-diagnostic function can be achieved with a mechanism that inverts Lo).

Fourth Embodiment

Figure 6:
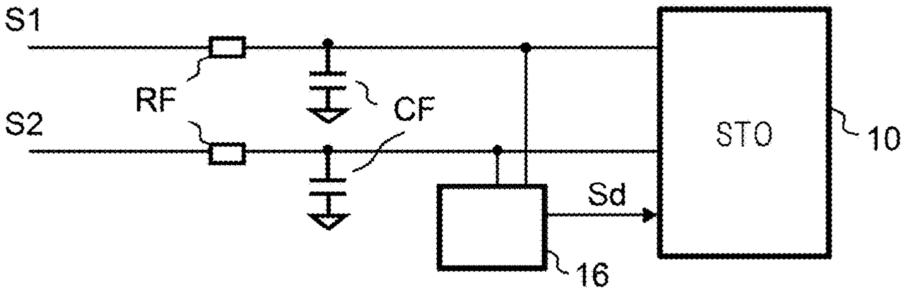
FIG. 6 is an example of a safety input circuit according to a fourth embodiment of the present disclosure.

FIG. 6 is a circuit diagram showing a configuration example in the case where an electrical input circuit is provided in the transmission path of the safety input signals S1 and S2 in the motor controller according to a fourth embodiment of the present disclosure.

In the example shown in FIG. 6, a first-order time lag filter consisting of a resistor RF and a capacitor CF is provided in front of the safety monitoring unit 16 and the safe torque-off circuit 10 in the transmission path of the safety input signals S1 and S2, and is inputted to the safety monitoring unit 16 and the safe torque-off circuit 10.

In each first-order time lag filter, the output side terminal of the resistor RF is connected to one terminal of the capacitor CF and the input terminals of the safety monitoring unit 16 and the safe torque off circuit 10. Also, the other terminal of the capacitor CF is connected to the reference potential. Furthermore, the time constant of each first-order time lag filter is sufficiently larger than the time constant of the RC time constant circuit defined by the resistor R12 (second resistor) and capacitor C11 of the safety monitoring unit (command monitoring unit) 16 described above is set to become enough to shorten.

According to the circuit configuration described above, the STO operation can be obtained in the safe torque-off circuit 10 without waiting for the diagnosis (Sd=High) by the safety monitoring unit 16, and the desired response is obtained as the multiple safety input signals S1 and S2.

Fifth Embodiment

FIG. 7 is a diagram according to a fifth embodiment, and is a circuit diagram showing an example in which the motor controller of the present disclosure can be applied to a safety function different from STO.

A motor controller 1B shown in FIG. 7 is additionally equipped with a safety control unit 20, and includes safety input signals S1 and S2, a diagnostic protection signal Sd, and the output of the encoder 4 (rotor position information of the motor 3) and is inputted to the safety control unit 20. The safety control unit 20 is arranged before the motor control calculator 14 and the safe torque off circuit 10 and after the external safety device 2 and the safety monitoring unit (command monitoring unit) 16, and the position of the rotor.

Here, the safety control unit 20 has a function of outputting double deceleration commands SL1 and SL2 to the motor control calculation block 14. The safety control unit 20 also has a function of outputting double safe stop (STO) commands ST1 and ST2 to the safe torque-off circuit 10.

The safety control unit 20 can be realized by analog and digital circuits, software such as a microcomputer, or a combination thereof.

Further, the motor controller 1 may have a configuration in which a part of the functions of the motor controller 1 are separated and added as an option. For example, the safety monitoring unit 16 and the safety control unit 20 shown in FIG. 7 may be optional blocks that can be attached and detached via an interface or the like, separate from the main body (that is, the internal blocks of the motor controller 1). With such a configuration, any type of safety function can be added as required. Therefore, the cost of the main body of the motor controller 1 can be reduced, and the optimum safety function for the motor 3 can be selected according to the type and operation of the motor 3 and the device to which the motor 3 is attached.

In one standard, the safety function Safe Stopl (SS1) is defined as a safe stop function having a period of deceleration based on a predetermined deceleration pattern as a step prior to torque-off stop at STO. As means for realizing SS1 that ensures such a deceleration period, the safety control unit 20 performs the following control.

When the safety control unit 20 receives a stop command or a safety stop command (Sd=High) from the safety monitoring unit 16 as the safety input signals S1 and S2, it sends double deceleration commands SL1 and SL2 to the motor control calculation block 14, and begins monitoring the speed of motor 3 based on signals received from encoder 4. When the speed of the motor 3 becomes equal to or lower than a predetermined speed (threshold speed) as a result of the monitoring, the safety control unit 20 sends an STO command to the safe torque-off circuit 10. Such control prevents the motor 3 from suddenly stopping when the safety input signals S1 and S2 are outputted, thereby preventing damage to the corresponding device and ensuring the safety of workers working with the device and the security can be ensured or expected.

Sixth Embodiment

Figure 8:
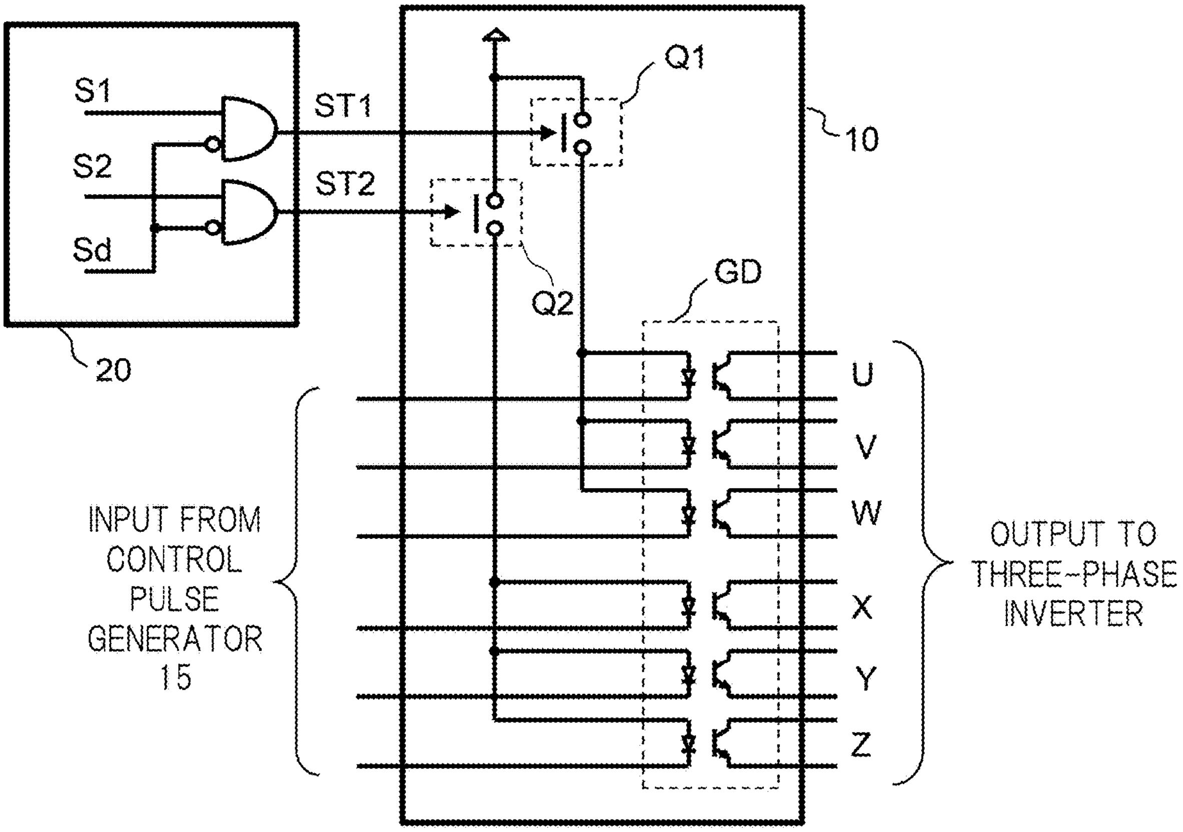
FIG. 8 is a circuit diagram showing another specific example of a safety control block and a safe torque-off circuit according to a sixth Embodiment of the present disclosure.

FIG. 8 shows an example of internal circuits of the safety control unit 20 and the safe torque-off circuit 10 in a sixth embodiment. In the circuit configuration shown in FIG. 8, the output of the safety control unit 20 is logically configured so that ST1 and ST2 become Lo when the diagnostic protection signal Sd is High, and when the diagnostic protection signal Sd occurs, the STO can work at once. Even in such a configuration, by utilizing the safety monitoring block 16 and the diagnostic protection signal Sd for diagnosis of the safety inputs S1 and S2, a safety system with fewer failures can be realized.

Seventh Embodiment

Figure 9:
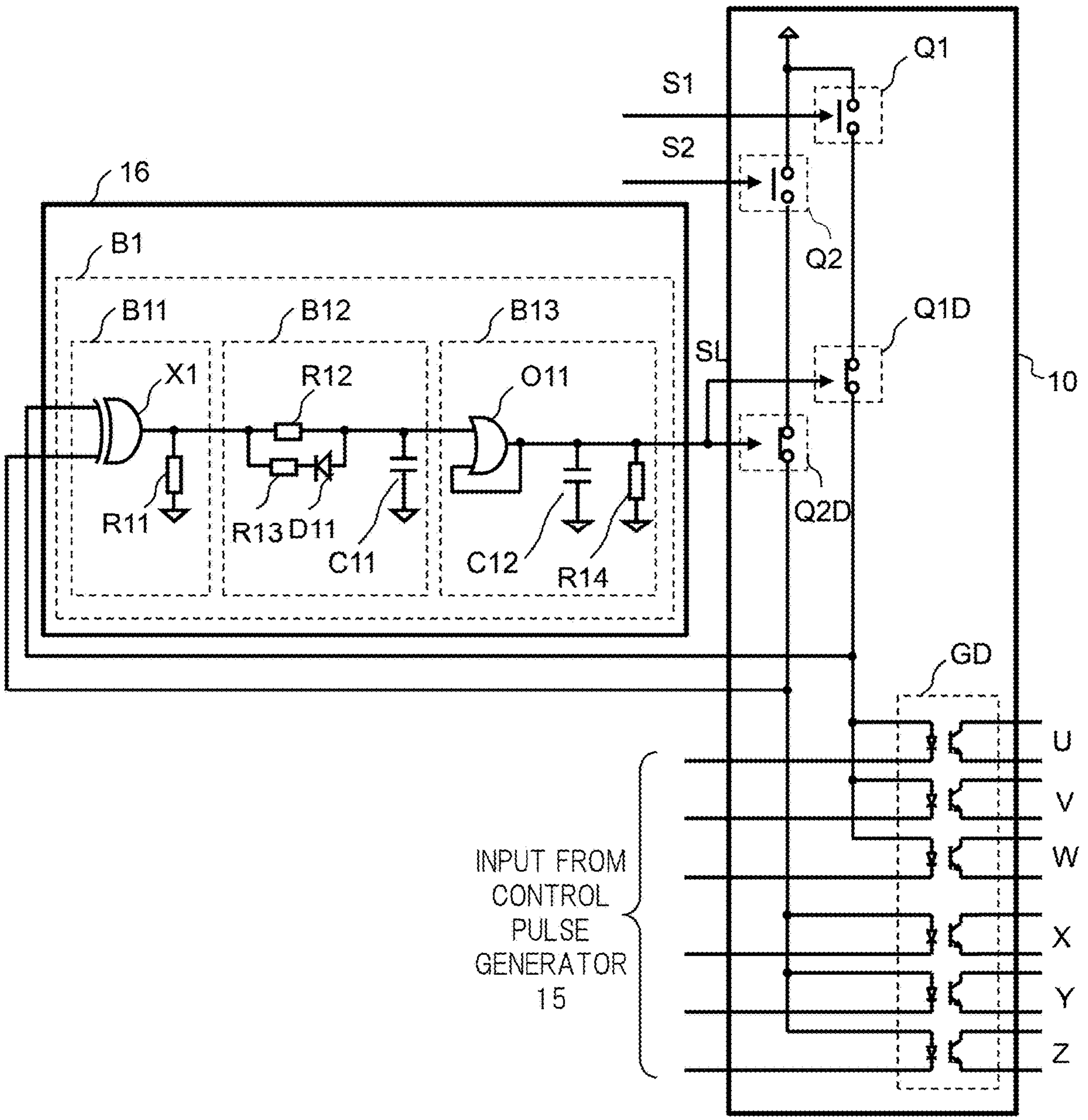
FIG. 9 is a circuit diagram showing another specific example of a safety control block and a safe torque-off circuit according to a seventh embodiment of the present disclosure.

FIG. 9 is an example of an internal circuit of the safety monitoring unit 16 and the safe torque-off circuit 10 according to a seventh embodiment. In the circuit configuration shown in FIG. 9, inside the safe torque-off circuit 10, second anode cutoff switches Q1D and Q2D are inserted between the outputs of the anode cutoff switches Q1 and Q2 and the anode of the gate drive element GD.

The second anode cutoff switches Q1D and Q2D are normally ON (hereinafter referred to as "normally on") polarity, and are driven (switched off) by the high output of the diagnostic protection signal SL. With this configuration, when a difference is detected between the safety input signal S1 and the safety input signal S2, the diagnosis protection signal SL outputs a high signal, thereby turning off both the second anode cutoff switches Q1D and Q2D. As a result, the motor 3 is in a torque-off state.

Among them, the anode cutoff switches Q1 and Q2, which play a role of cutting off the drive signals supplied to the motor 3 in response to the commands S1 and S2 (safety input signals), correspond to the "first cutoff unit" in the present disclosure. On the other hand, the second anode cutoff switches Q1D and Q2D, which serve to cut off the drive signal supplied to the motor 3 in response to the diagnostic protection signal SL (safety stop signal), are the "second cutoff unit" in the present disclosure. In this embodiment, the anode cutoff switch Q1 and the second anode cutoff switch Q1D in the first cutoff unit are connected in series, and similarly, the anode cutoff switch Q2 and the second anode cutoff switch Q2D in the first cutoff unit are connected in series.

Furthermore, in the circuit configuration shown in FIG. 9, the signal to be inputted to the safety monitoring unit 16 is inputted so as to feed back the output voltage of the second anode cutoff switches Q1D and Q2D (second cutoff unit). As described above, the second anode cutoff switches Q1D and Q2D have normally-on polarities. Therefore, while the diagnostic protection signal SL is Low after the device is started, the input to the safety monitoring unit 16 is not for other implementations. Signals corresponding to the safety input signals S1 and S2 are input in the same manner as in the form.

On the other hand, after the safety monitoring unit 16 sets the diagnostic protection signal SL to High, the second anode cutoff switches Q1D and Q2D are turned off, so that the inputs to the safety monitoring unit 16 are the safety input signal S1 and the safety input signal S2. Although there is a possibility that the input state of is not reflected, the torque-off state of the motor 3 is maintained by the action of the latch unit B13, so the safety function can be achieved.

In this way, if the safety monitoring unit 16 is configured to feed back the downstream signal as an input of the safety monitoring unit 16 to the part (the second anode cutoff switches Q1D and Q2D in this embodiment) that operates the torque off, FIG. 3, the second processing block B2 and the third processing block B3 are not necessary, which contributes to the miniaturization of the apparatus.

Although the present invention has been described above based on the embodiments, the present invention is not limited to the configurations of the above-described embodiments, and various modifications are possible. In the embodiment described above, addition, deletion, replacement, etc. of components are possible except for essential components. Unless otherwise specified, each component may be singular or plural. A configuration in which various configuration examples are combined is also possible.

EXPLANATORY SYMBOLS

1, 1A, 1B Motor controller
2, 2A External safety device
2B Monitor device
3 Motor
4 Encoder
5 AC main power supply
10 Safe torque off circuit (motor control unit)
11 Three-phase inverter (motor control unit, power semiconductor)
12 AC/DC conversion circuit
13 Current detector
14 Motor control calculator (motor control unit)
15 Control pulse generator (motor control unit)
16 Safety monitoring unit (command monitoring unit)
20 Safety control unit (motor control unit)
141 Notification unit
142 Operation unit
A1, A2 Logic AND element
B1 First processing block (first signal processing unit)
B2 Second processing block (second signal processing unit, NAND unit)
B3 Third processing block
S1, S2 Safety input signal (multiplex Command) Sd Diagnosis protection signal
Q1, Q2 Anode cutoff switch
BF0, BF1, BF2 Buffer element
GD Gate drive element
B11 XOR unit
X1 . . . XOR element, R11 . . . Pull-down resistor
B12 Charge/discharge unit
R12 . . . Resistor (second resistor), C11 . . . Capacitor, R12,
C11 (RC time constant circuit), D11 . . . Diode, R13 . . . Resistor, D11,
R13 (diode circuit)
B13 Latch unit
O11 . . . OR element
QT1, QT2 Test switch
RF, CF Primary lag filter
ST1, ST2 Stop (STO) command
SL1, SL2 Deceleration command

The invention claimed is:

1. A controller comprising:

a motor driver sending a drive current to a motor to put the motor into a normal operation state and controls the motor so that the normal operation state goes into a safe stop state according to a multiplexed command related to a safety function operation sent from outside; and a command monitoring unit monitoring whether each of a plurality of commands in the multiplexed command match each other, wherein when a period in which the commands do not match each other exceeds an allowable value, the command monitoring unit generates a safe stop command to cause the motor to stop and continuously sends the generated safe stop command to the motor controller.

2. The controller according to claim 1, wherein the command monitoring unit includes:

a comparison unit comparing each of the commands and outputting a difference therebetween as a High signal;

a power storage accumulating charges of the High signal; and a safe stop command generator generating and outputting the safe stop command when a voltage of the power storage exceeds the threshold.

3. The controller according to claim 1, wherein the command monitoring unit has an XOR unit, a charging/discharging unit, and a latch unit connected in series in this order, the XOR unit has an XOR element that computes and outputs an exclusive OR of the commands, and a first resistor that pulls down an output of the XOR element, the charging/discharging unit includes an RC time constant circuit configured by a second resistor, one end of which is connected to an output terminal of the XOR element, and a capacitor connected to an other end of the XOR element, the capacitor is charged when the output of the XOR element is High, and the capacitor discharges the charges of the capacitor when the output of the XOR element is Low, and the latch unit includes an OR element having a first input terminal connected to a positive voltage terminal of the capacitor, and a pull-down resistor for pulling down the output of the OR element, and the output of the OR element is directly connected to a second input terminal of the OR element.

4. The controller according to claim 1, wherein the command monitoring unit is configured to branch the multiplexed command in parallel to a first signal processing unit and a second signal processing unit, respectively, and send a High signal as the safe stop command to the motor controller based on an operation output of the first signal processing unit and an operation output of the second signal processing unit, the first signal processing unit has an XOR unit, a charging/discharging unit, and a latch unit connected in series in this order, the second signal processing unit has a NAND unit that NAND-calculates the multiplexed commands and outputs them, the XOR unit includes an XOR element that calculates and outputs an exclusive OR of the commands, and a first resistor that pulls down the output of the XOR element, the charge/discharge unit has an RC time constant circuit configured by a second resistor, one end of which is connected to an output terminal of the XOR element, and a capacitor which is connected to another end of the second resistor, charges the capacitor when an output of the XOR element is High, and discharges charges of the capacitor when the output of the XOR element is Low, the latch unit includes an OR element whose first input terminal is connected to a positive voltage terminal of the capacitor, and a pull-down resistor that pulls down the output of the OR element, and the output of the OR element is directly connected to the second input terminal of the OR element, and the NAND unit includes a logic NAND element for calculating and outputting a negative logical product of the command, and a pull-up resistor that pulls up an output of the NAND element.

5. The controller according to claim 1, wherein the motor control unit inputs:

a motor control calculator inputting the drive current supplied to the motor and a position of a rotor of the motor, performs calculation for obtaining a control operation amount for correctly operating the motor, and outputs the calculated control operation amount;

a power semiconductor having a switch circuit that adjusts the drive current sent to the motor based on the control operation amount from the motor control calculator; and a safe stop control unit that performs control for reducing the drive current sent to the motor according to the safe stop command.

6. A processing device to which the controller according to claim 1 is connected and is powered by a motor controlled by the controller.

7. The controller according to claim 2, wherein the power storage includes a capacitor, and has an RC time constant circuit charging the capacitor so as to ensure a time from when the High signal is outputted until the voltage of the capacitor exceeds the threshold, the safe stop command generator includes a latch unit that holds an output of the safe stop command when the voltage of the capacitor exceeds a threshold, and the motor controller performs control so as to cut off or reduce the drive current supplied to the motor when receiving the safe stop command.

8. The controller according to claim 4, wherein the charging/discharging unit of the first signal processing unit has a series circuit of a third resistor and a diode connected in parallel to the second resistor, and the diode has an anode connected to an output terminal side of the second resistor and a cathode connected to an input terminal side of the second resistor, thereby rectifying part of the charges accumulated in the capacitor of the RC time constant circuit in a discharging direction through the third resistor.

9. The controller according to claim 4, comprising a delay filter circuit before the motor control unit and the command monitoring unit, wherein a time constant of the delay filter circuit is shorter than a time constant of the RC time constant circuit.

10. The controller according to claim 5, wherein the safe stop control unit is provided after the motor control calculator and before the power semiconductor, when the safe stop command is not generated from the command monitoring unit, a signal of the control operation amount is transferred to the power semiconductor, when the safe stop command is generated from the command monitoring unit, the switch circuit of the power semiconductor is switched off and the drive current sent to the motor is cut off by interrupting the transfer of the signal of the control operation amount.

11. The controller according to claim 5, wherein the safe stop control unit:

includes a circuit in which a first cutoff unit that cuts off the drive current supplied to the motor according to the command, and a second cutoff unit that cuts off the drive current suppled to the motor according to the safe stop command being connected in series, an output of the circuit is inputted to the XOR unit of the command monitoring unit, and an output of the latch unit of the command monitoring unit being supplied as the safety stop command to the second cutoff unit; and performs control for reducing the drive current sent to the motor according to the command and the safety stop command.

12. The controller according to claim 7, further comprising a notification unit notifying an external device of a state of a signal outputted from the latch unit.

13. The controller according to claim 10, further comprising a safety control unit arranged in a stage before the safe stop control unit and the motor control calculator, and inputs the multiplexed command, the signal from the command monitoring unit, and a position of the rotor, wherein when the safety stop command is generated from the command monitoring unit, the safety control unit performs control so as to gradually decrease the drive current sent to the motor based on a rotation operation of the motor, and then performs control to cut off the drive current sent to the motor.

14. The controller according to claim 12, further comprising an operation unit operating so that at least one of the plurality of commands in the multiplexed command is not sent to the motor controller.

* * * * *